United States Patent
Blong

(10) Patent No.: US 7,008,587 B2
(45) Date of Patent: Mar. 7, 2006

(54) METHODS OF IMPROVING EXTRUSION PROPERTIES IN AN EXTRUDATE

(75) Inventor: Thomas J. Blong, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 6 days.

(21) Appl. No.: 10/915,614

(22) Filed: Aug. 10, 2004

(65) Prior Publication Data

US 2005/0006811 A1    Jan. 13, 2005

Related U.S. Application Data

(62) Division of application No. 10/015,154, filed on Dec. 11, 2001, now Pat. No. 6,790,912.

(51) Int. Cl.
B29C 47/00    (2006.01)

(52) U.S. Cl. .................... 264/176.1; 525/197; 525/199

(58) Field of Classification Search ............... 428/35.7; 525/197, 199; 264/176.4
See application file for complete search history.

(56) References Cited

U.S. PATENT DOCUMENTS

| 4,617,351 A | 10/1986 | Heckel, Jr. et al. |
| 5,051,479 A | 9/1991 | Logothetis et al. |
| 5,527,858 A * | 6/1996 | Blong et al. ................. 525/187 |
| 5,549,948 A | 8/1996 | Blong et al. |
| 5,552,199 A | 9/1996 | Blong et al. |
| 5,688,457 A | 11/1997 | Buckmaster et al. |
| 5,710,217 A * | 1/1998 | Blong et al. ................. 525/199 |
| 5,908,704 A | 6/1999 | Friedman et al. ........... 428/426 |
| 6,117,508 A | 9/2000 | Parsonage et al. |

FOREIGN PATENT DOCUMENTS

| JP | 52-86442 | 7/1977 |
| JP | 52086442 | 7/1977 |
| JP | 58-21440 | 2/1983 |
| JP | 58021440 | 2/1983 |
| JP | 58-38740 | 3/1983 |
| JP | 5803740 A | 3/1983 |
| JP | 6-23701 | 6/1985 |
| JP | 4-93221 | 3/1992 |
| WO | WO 96/24625 | 8/1996 |
| WO | WO 01/46313 A1 | 6/2001 |

* cited by examiner

Primary Examiner—Sandra Nolan Rayford
(74) Attorney, Agent, or Firm—Dean M. Harts

(57) ABSTRACT

Methods of improving the extrusion properties in an extrudate are provided. The methods include blending a major amount of a first fluoropolymer containing a semi-crystalline fluorinated copolymer and a minor amount of a second fluoropolymer effective to improve extrusion properties in the composition, and melt processing the blend to form the extrudate.

16 Claims, No Drawings

METHODS OF IMPROVING EXTRUSION PROPERTIES IN AN EXTRUDATE

CROSS REFERENCE TO RELATED APPLICATION

This application is a divisional of U.S. application Ser. No. 10/015,154, filed Dec. 11, 2001, U.S. Pat. No. 6,790,912, the disclosure of which is herein incorporated by reference.

TECHNICAL FIELD

This invention relates to melt processable fluorothermoplastic compositions comprising a blend of different fluoropolymers, as well as methods of improving extrusion properties in extruded fluorothermoplastics.

BACKGROUND

Fluoropolymers have found wide utility in a vast array of applications. However, they are often beset by processing difficulties. Specific difficulties include surface roughness such as melt fracture and other problems such as die drooling.

Higher processing temperatures can reduce some of these problems, but may involve other problems. One such problem is the molecular weight degradation of the fluoropolymer. This can result in reduced physical properties, can contribute to the die drool, and the corrosive by-products can lead to premature wear of the processing equipment.

Another alternative to reduce the surface roughness of extrudates is to reduce the processing rate. This increases the residence time of the fluoropolymer in an extruder, which also contributes to degradation. Reducing production rates is also economically undesirable.

Decreasing the molecular weight of the input fluoropolymer can allow for limited improvements in output, but this also decreases the mechanical properties of the polymer. Such a mechanical property detriment may then be partially offset by the addition of costly comonomers, but this modification can add production complications and detract from other physical properties.

Another approach toward reducing surface defects in fluoropolymers has been to create a mixture of several fluoropolymers having similar composition yet of significantly different molecular weights in attempt to balance the polymer properties with the processing parameters. In theory, a lower molecular weight portion allows for higher output rate with the blend, while a higher molecular weight portion improves the mechanical properties of the blend. This compromise achieves limited success and increases the complexity required to produce such a material.

Yet another approach involved adding a polyolefin to specific fluoropolymers. However, the temperatures necessary for processing fluoropolymers are usually too high for this approach. In addition, such a material can negatively affect properties of the fluoropolymer, such as color, permeation rate, and chemical resistance.

JP 60-23701 describes a blend of a fluorinated elastomer and a copolymer of tetrafluoroethylene and hexafluoropropene (FEP) to achieve heat stress-crack resistance. U.S. Pat. No. 5,051,479 describes a melt-processable thermoplastic consisting essentially of a blend of a fluoropolymer and an elastomeric tetrafluoroethylene-perfluoro(alkyl vinyl) ether copolymer.

SUMMARY

Despite these attempts, there is still a great need to be able to process fluoropolymer materials at higher output rates while maintaining a quality finish on the part and without sacrificing mechanical properties.

Accordingly, the present invention provides a melt processable fluorothermoplastic composition comprising a major amount of a first semi-crystalline fluorinated copolymer and a minor amount of a second fluoropolymer effective to reduce melt defects in the composition. Each fluoropolymer is selected from four classes. The first class, (a), includes a semi-crystalline perfluorinated copolymer. The second class, (b), includes a fluoropolymer derived from interpolymerized units of at least one essentially perfluorinated monomer and at least one non-fluorinated hydrogen-containing monomer. The third class, (c), includes a fluoropolymer derived from interpolymerized units of at least one partially-fluorinated monomer, and optionally at least one essentially perfluorinated monomer. The fourth class, (d), includes an amorphous copolymer of tetrafluoroethylene and hexafluoropropylene. When the first fluoropolymer is selected from (a), the second fluoropolymer is a semi-crystalline fluoropolymer selected from (b) and/or (c). When the first fluoropolymer is selected from (b), the second fluoropolymer is selected from (a), (c), and/or (d). When the first fluoropolymer is a copolymer selected from (c), the second fluoropolymer is selected from (a), (b), and/or (d).

In another aspect, the present invention provides a melt processable fluorothermoplastic composition comprising a major amount of a semi-crystalline fluorinated copolymer and a minor amount of a fluoropolymer effective to reduce melt defects (such as melt fracture or surface roughness) in the composition. The second fluoropolymer (minor amount) is selected from an amorphous fluorinated copolymer derived from interpolymerized units of a perfluoro (alkoxy vinyl) ether and a comonomer which may be partially or fully fluorinated, and/or an amorphous fluorinated copolymer derived from interpolymerized units of at least 3 mole percent (mol %) of an hydrogen containing comonomer, and a perfluoro (alkoxy vinyl) ether and/or a perfluoro (alkyl vinyl) ether. This group of materials may also be used in conjunction with the other minor component fluoropolymers as defined herein.

In another aspect, the present invention provides a method of improving extrusion properties in an extrudate. This method comprises blending a major amount of a first semi-crystalline fluorinated copolymer and a minor amount of a second fluoropolymer effective to improve extrusion properties in the composition, and melt processing the blend to form the extrudate. In this method, each fluoropolymer is selected from one of four classes: (i) a semi-crystalline perfluorinated copolymer; (ii) a fluoropolymer derived from interpolymerized units of at least one essentially perfluorinated monomer and at least one non-fluorinated hydrogen-containing monomer; (iii) a fluoropolymer derived from interpolymerized units of at least one partially-fluorinated monomer, and optionally at least one essentially perfluorinated monomer; and/or (iv) an amorphous fluorinated copolymer derived from interpolymerized units of a perfluoro (alkoxy vinyl) ether and a comonomer which may be partially or fully fluorinated, and/or an amorphous fluorinated copolymer derived from interpolymerized units of at least 3 mole percent (mol %) of an hydrogen containing comonomer, and a perfluoro (alkoxy vinyl) ether and/or a perfluoro (alkyl vinyl) ether. Also in this method, when the first fluoropolymer is selected from (i), the second fluoropolymer is a fluoropolymer selected from at least one material of class (ii), a semi-crystalline material of class (iii), and/or a material from class (iv); when the first fluoropolymer is selected from (ii), the second fluoropolymer is selected from (i), (iii), and/or (iv); and when the first fluoropolymer is a copolymer selected from (iii), the second fluoropolymer is selected from (i), (ii), and/or (iv).

When a fluoropolymer is melt-processed, issues of surface defects, output rates, and mechanical properties must be addressed. Surprisingly, when these same fluoropolymers are used in blends of the present invention, remarkably improved processing flexibility results. The extrudable compositions of the invention are not as prone to the thermal instability issues of known blends. In addition, the end-use properties of articles made from the major component fluoropolymer, such as permeation, extraction, and chemical resistance, can be preserved in the fluoropolymer blends of the present invention.

DETAILED DESCRIPTION

In one aspect of the present invention, a fluoropolymer blend is comprised of combinations of fluoropolymers selected from four distinct classes. Materials are selected from at least two different classes to form the fluoropolymer blend of the invention.

The fluoropolymers and fluoropolymer blends of the invention are melt processable. As used herein, "melt processable" means that the material can be repeatedly processed with the assistance of heat. That is, the fluoropolymers and fluoropolymer blends can be extruded without thermosetting or cross-linking.

The fluoropolymers of the invention preferably have a melt flow index (MFI) of about 1 g per 10 min or greater, under a load of 5 kg at the temperature at which they are to be processed. In general, the fluoropolymers will have a melt viscosity of less than about $10^6$ Poise at the desired processing temperature. In addition, the molecular weight of the fluoropolymer is sufficiently high so as not to be considered oligomeric, i.e., a number average molecular weight above about 10,000 g/mol.

The fluoropolymers in the blend of the invention are selected from four classes. The first class comprises monomers that are essentially perfluorinated. As used herein, "essentially perfluorinated" means that less than about 5 weight percent (wt %), more preferably less than about 1 wt % or even 0 wt %, of the monomers have hydrogen substituents. The other two classes of fluoropolymer in the blend of the invention are partially fluorinated. These fluoropolymer contain interpolymerized units of hydrogen containing monomers. The constituent fluoropolymers will now be described more particularly.

The first class of fluoropolymers contains interpolymerized units of tetrafluoroethylene (TFE) and at least one other essentially perfluorinated monomer of the general formula (I): $CF_2=CFR$, wherein R is $R_f$, $R_fX$, $R_f'X$ or Cl; wherein X is F, Cl, Br, or H, $R_f$ is a perfluorinated alkane, and $R_f'$ is: $O(R_f^2O)_a(R_f^3O)_bR_f^4$ where $R_f^2$ and $R_f^3$ are the same or are different linear or branched $C_1$–$C_6$ perfluoroalkylene groups; a and b are, independently, 0 or an integer from 1 to 10; and $R_f^4$ is a $C_1$–$C_6$ perfluoroalkyl group. Examples of the monomers of this formula include hexafluoropropylene (HFP), chlorotrifluoroethylene (CTFE), perfluoroalkyl vinyl ethers (PAVE), and the perfluoroalkoxy vinyl ethers (PAOVE). Examples of the perfluoroalkyl vinyl ethers include perfluoromethyl vinyl ether (PMVE), perfluoroethyl vinyl ether (PEVE), perfluoropropyl vinyl ether (PPVE), and the like, some of which are shown below.

| | |
|---|---|
| $CF_2=CFOCF_3$ | PMVE |
| $CF_2=CFOCF_2CF_3$ | PEVE |
| $CF_2=CFOCF_2CF_2OCF_3$ | MV21 |
| $CF_2=CFOCF_2CF_2CF_2OCF_3$ | MV31 |
| $CF_2=CFOCF_2CF_2CF_3$ | PPVE1 |
| $CF_2=CFOCF_2CFOCF_2CF_2CF_3$<br>$\quad\quad\quad\quad\;\; |$<br>$\quad\quad\quad\quad\;\, CF_3$ | PPVE2 |
| $CF_2=CFOCF_2CFOCF_2CFOCF_2CF_2CF_3$<br>$\quad\quad\quad\quad\;\; |\quad\quad\;\; |$<br>$\quad\quad\quad\quad\, CF_3\quad\, CF_3$ | PPVE3 |

Combinations of perfluoroalkyl vinyl ethers and perfluoroalkoxy vinyl ethers may also be used.

The amount of essentially perfluorinated comonomer present with the TFE in the fully fluorinated polymer is limited to the amounts that allow it to be melt processable and remain a semi-crystalline material. Typically this will range between about 2% and 30% by weight depending on the comonomer chosen and the desired properties of the fluoropolymer. In addition, these materials may be treated with fluorine to further improve their thermal stability by known methods.

The second and third classes of fluoropolymers useful in preparation of the invention are referred to as partially fluorinated fluoropolymers, for they contain some constituent hydrogen atoms. Specifically, these fluoropolymers contain interpolymerized units derived from at least one monomer that contains hydrogen. These two classes of partially fluorinated fluoropolymers are distinguished from one another by the type of constituent hydrogen containing interpolymerized units. The monomers used to make the fluoropolymer in the first of these classes contain both non-fluorinated hydrogen-containing monomers and essentially perfluorinated monomers. The monomers used to make the fluoropolymer in the second of these classes include both hydrogen and fluorine.

The second class of fluoropolymers useful in forming the blend of the present invention comprises interpolymerized units of non-fluorine containing monomers. Such non-fluorine containing monomers useful for copolymerizing with a fluorine containing monomer include ethylene, propylene, and higher alkenes and dienes. These non-fluorine-containing monomers are typically present at a level of at least 5% and are copolymerized with TFE, HFP, and/or combinations of other monomers from Formula I. These materials may be either semi-crystalline or amorphous. In addition they may also contain minor amounts of partially fluorinated monomers, such as vinylidene fluoride (VF2). Typically such monomers are present at a level of less than about 15% by weight, preferably less than about 10% or even about 5%. In many instances, these polymers are essentially free of partially fluorinated hydrogen containing monomers, and contain less than 1 wt % or even 0 wt % of these monomers. In particular these monomers may be free of those partially fluorinated hydrogen containing monomers which may detract from the base resistance of the polymer. In other instances, certain specific partially fluorinated monomers, such as perfluorobutyl-ethylene (PFBE), which do not significantly detract from the chemical resistance of the fluoropolymer readily may be used.

The third class of fluoropolymers useful in forming the blend of the present invention is also partially-fluorinated, hydrogen-containing fluoropolymers. These fluoropolymers contain at least 5% by weight of at least one partially fluorinated monomer that contains both hydrogen and fluorine atoms. Suitable monomers include primarily vinylidene fluoride, but also may include vinyl fluoride, and/or trifluoroethylene. This third class of copolymers is comprised of either homopolymers of these partially fluorinated monomers or copolymers of these monomers with TFE, HFP, and/or monomers of Formula I. They may also contain below about 5 wt % of other non-fluorinated monomers. This third class of fluoropolymers sometimes has been characterized in the art as having decreased chemical resistance to bases in comparison to the other described groups and may be more prone to dissolution or swelling by hydrocarbon solvents.

The fourth class of fluoropolymers useful in forming the blend of the present invention comprises amorphous copolymers of TFE and HFP.

The melt processable fluoropolymer blend of the invention is formed by blending two or more fluoropolymers selected from at least two of the four above-described groups of fluoropolymers. The first blend component is present in a major amount, i.e., at least about 90 weight percent (wt %), more preferably at least about 95 wt % and often 98 wt % or greater, based on the total blend. This first blend component is chosen for its inherent mechanical or physical properties for a desired application and it imparts these properties to the extrudate. This first blend component is semicrystalline, i.e., it has a discernible melting peak. The major component often is comprised of only one polymer, but it may also comprise two or more fluoropolymer materials that are preferably selected from the same group of fluoropolymers. If two or more fluoropolymers comprise the major component, they should have sufficient compatibility such that they do not significantly phase-separate during extrusion.

Intermediate blends may be produced to contain as low as 90%, 80%, or even 50% of the major component with the minor component making up the difference. These blends may also provide utility in the process of the invention.

The second blend component, which constitutes the minor portion of the fluoropolymer blend, is chosen from one or both of the remaining classes of fluoropolymers that were not selected as the first blend component. This minor blend component may also comprise two or more fluoropolymers selected from one, or both, of the remaining classes. The second blend component normally has a minimal effect, or no apparent effect on the mechanical properties of the extrudate or the finished article in the intended application. It aids the extrusion properties and improves the final surface characteristics of the extrudate. This second blend component is preferably melt-processable at the desired processing conditions of the first blend component.

Typically the minor component is present at a level of less than 5% by weight of the fluoropolymer blend, preferably less than 2%. In many instances, the level of this second component can be much less than 5%, such as 1% or lower, and still provide the significant benefits of the invention. In some aspects, levels of 0.5% or even 0.05% can provide benefits over the major blend component alone.

One helpful criterion for the selection of the minor component is that it should be largely immiscible with the first component. By selecting the minor component from one of the remaining groups of fluoropolymers, other than that chosen from for the major component, this immiscibility may be achieved. A simple test for determining immiscibility involves preparing a blend of the two materials at a temperature above the melting point, or above the melt processing temperature, of either material. At sufficiently high levels of the minor component, the blend component visually will appear more opaque, milky, or cloudy in comparison to either of the individual components. Amounts of the minor component necessary to achieve this affect typically vary from below about 1% up to about 5% by weight based on the total weight of the major and minor components. At lower levels of the minor component, or if the two dissimilar fluoropolymers of the blend have a similar refractive index, this effect may be unnoticed. However, the minor component will remain immiscible and may be detected by known optical microscopy methods.

The immiscibility between the major and minor components of the blend is attributed to the difference in interpolymerized units in the individual polymeric components of the polymer blend. For example, one component may lack a specific monomer that is appreciably present in the other component. These differentiating monomers may be either randomly dispersed throughout the component polymer, or alternatively they may be more concentrated in certain portions of the polymer such as in a block co-polymer or a core-shell type polymer. Typically this monomeric difference will be in the presence or lack of one of the two types of hydrogen containing monomers.

In addition, the fluoropolymer utilized in either component may contain other monomers that augment the immiscibility between the two components. Examples of this include longer chain monomers, which impart side chains when polymerized, or those that impart chemical functionality or may serve to make the polymer chain more polarizable. Examples include, those of Formula I, wherein $R_f$ contains at least one carbon atom and preferably at least one oxygen atom. Other possibilities include both fluorinated and/or hydrogenated monomers that contain cyclic or aromatic structures, those substituted with other hetero-atoms, and monomers with chemically-functional groups. It is possible for both components of the fluoropolymer blend to contain some of the same types of monomers, provided that they do not have the adverse effect of making the two polymers compatible or miscible. The more highly modified material typically should be the minor component of the blend.

In addition to its immiscibility, the minor component will typically have a viscosity that is similar to that of the major component at the intended processing conditions of the blend. The minor component may be comprised of two or more fluoropolymers of significantly different molecular weight and/or composition, and may or may not be miscible with one another. The combination of the minor components remains immiscible with the major component of the blend. In addition, the minor component will be of appreciable molecular weight such that it does not easily migrate or is not easily extracted from a finished article of the blend. Minor components that are semi-crystalline or are insoluble in common hydrocarbon solvents can also serve to minimize the extractability.

The monomeric composition of the minor component may also be chosen to minimize its influence on the physical properties of the major component. For instance if the fluoropolymer blend is used for electrical insulation, the use of monomers which increase the dielectric constant or dissipation factor should be minimized.

The fluoropolymers used in the formation of the blend will contain at least 30% fluorine by weight and preferably will contain 40% or more. The percent fluorine will also depend on whether the particular fluoropolymer is used as the major or minor component and the intended end use application for the blend. That is, many major component fluoropolymers should contain at least about 60% fluorine and some will contain 70% or more. In one aspect where the end-use application of the fluoropolymer is wire coating for high speed data transfer, the major component could be an essentially perfluorinated material such as FEP, which can contain up to 76% fluorine by weight. Another example for the major component would be a copolymer of TFE, VF2 and HFP, which contains about 70% fluorine or more, for use as for a flexible fuel hose barrier. In either case, the minor component used to form the blend could be, for example, a hydrogen-containing fluoropolymer comprising interpolymerized units of ethylene or propylene that contains about 65% to 60% or less of fluorine, or alternatively the minor phase may be an essentially perfluorinated amorphous copolymer of TFE and MV-31.

The major and minor blend components can be combined through any known means. The minor component preferably is well dispersed within the major component of the fluoropolymer blend. The before-mentioned criteria for the selection of the minor component will aid in this dispersion, as will the incorporation and mixing technique chosen to prepare the blend. To effect the desired dispersion within the blend, the two components may be fed in a form such as pellet, powder, flake, or liquid dispersion, to a suitable blending or pre-blending device. Typical devices for blending the materials in the molten state include single and twin screw extruders and batch mixers. In addition, more than one of these mixing techniques may be used to form the blend in which the minor component is uniformly dispersed and randomly distributed. For instance, a higher amount of the minor component, at levels up to about 20%, may first be blended into the major component using a twin screw extruder. This blend may then be diluted with more of the major component using another mixing technique to form the final desired composition of the fluoropolymer. This final blending step may also be the same step that is used to form a finished extruded article. When the minor component is well dispersed, the fluoropolymer blend will enhance the performance benefits of the invention. Proper dispersion can also allow for lower use levels of the minor component.

When the major component of the blend is comprised of a perfluorinated polymer, the selected fluoropolymer will be copolymers of TFE and at least 2 wt % of one or more comonomers of Formula I. Preferred comonomers include HFP at levels up to about 20 wt % and/or PAVE (perfluoroalkylvinylethers) at levels of up to about 10 wt %. Copolymers of TFE and HFP are commonly referred to as FEP. Copolymers of TFE and PAVE, such as PPVE-1, are referred to as PFA. Commercially available polymers useful in the is aspect of the invention include FEP 6322, PFA 6502N, PFA FLEX X 6515 UHP from Dyneon LLC (Oakdale, Minn.); FEP 5100, PFA 950 HP and FEP CJ95 from DuPont (Wilmington, Del.), FEP NP101 and PFA 238SH from Daikin (Japan) and MFA 620 from Ausimont (Italy).

The minor component that is blended with the major component perfluorinated polymer will also be semi-crystalline. It is selected from either group of partially fluorinated fluoropolymers. Alternatively, it may be a polymer comprising any combination of the two different types of hydrogen containing monomers with other fluorinated polymers. Examples include ethylene-tetrafluoroethylene (ETFE), hexafluoropropylene-ethylene-tetrafluoroethylene (HTE), tetrafluoroethylene-propylene (TFE/P), poly(vinylidene fluoride) (PVdF), and tetrafluoroethylene-hexafluoropropylene-vinylidene fluoride (THV).

When the major component is chosen from the group of fluoropolymers that contain interpolymerized units lacking fluorine along with fluorinated monomers, the preferred materials are copolymers which contain both ethylene and TFE. Preferably the ethylene content is at least about 10 wt %. Additionally, these polymers may contain HFP, perfluoroalkylvinylethers, and other long chain monomers such as PFBE. Commercially available materials of these preferred polymers include ETFE 6235, ETFE 6235J, HTE X 1510 and HTE X 1705 from Dyneon and EFEP from Daikin.

The minor component for this blend can be selected from either the group of fully fluorinated copolymers or from the group of partially fluorinated polymers that are comprised of monomers which contain both fluorine and hydrogen. Examples of this latter group include homopolymers and copolymers of VF2 with monomers of Formula I. A group of preferred materials for the minor component are those that contain substantially lower levels of hydrogen containing monomers than does the major blend component. Examples of this group include copolymers of TFE with HFP and/or PPVE.

When the major blend component is selected from the group comprised of monomers that contain both hydrogen and fluorine, the fluoropolymer will be a copolymer of VF2 and at least one other copolymerizable comonomer. The preferred materials will contain at least 5 wt % and preferably 10 wt % and higher of essentially perfluorinated monomers. Preferred monomers include TFE and HFP, but may also contain smaller amounts of monomers from Formula I, such as PPVE. In many instances, the levels of VF2 in the major component may be as low as 15 wt % or 10 wt %, and in some aspects as low as 5 wt %. Commercially available polymers useful in this aspect of the invention include THV200, THV500, and THV815 from Dyneon.

The minor component for this blend is chosen from either the group of perfluorinated fluoropolymers or those formed from copolymers of fluorine free monomers with fluorine containing monomers. A group of preferred materials for the minor component in this blend are those that contain substantially different levels of hydrogen containing monomers than does the major component. Examples of this group include copolymers of TFE with HFP and/or a PAVE such as PPVE.

A preferred group of fluoropolymers, that is particularly well suited for use as the minor component in the formation of a blend of the invention (with any major component), are those copolymers which contain higher levels of perfluoroalkylvinylether or perfluoroalkoxyvinylether monomers and at least one copolymerizable comonomer. This group may be considered as a subset of any of the before mentioned classes of fluoropolymers, but it is not limited to being semi-crystalline. Typically the level of these specific monomers will be such that the fluoropolymer is nearly or completely amorphous and lack a discernable or appreciable melting point as determined by DSC (differential scanning calorimetry). The relatively high amounts of these monomers in the minor component fluoropolymer contributes to the immiscibility required of the blend.

Preferred comonomers for forming this class of minor component that are rich in PAVEs and/or PAOVEs include primarily TFE and VF2. Preferably, the fluoropolymer will contain at least 3 mole percent (mol %), more preferably at least about 5 mol %, of VF2 or other hydrogen containing monomers. When there is less than 3 mol % of VF2, the fluoropolymer will contain a perfluoro alkoxy vinyl ether monomer.

The uniqueness of this group of fluoropolymers allows them to be used as the minor component to form a fluoropolymer blend with any of the before mentioned semi-crystalline, melt processable fluoropolymers, provided that the two components remain immiscible. Specific examples include FEP as the major component and copolymers of TFE and MV-31 as the minor and THV as the major and copolymers of VF2 and PMVE as the minor blend component. In addition, other minor component fluoropolymers as defined herein may be used in conjunction with these PAVE/PAOVE materials.

Additives such as pigments, fillers, conductive agents and inorganic materials are often added to modify the properties of fluoropolymers. The ability to incorporate these materials and to achieve good dispersion and distribution of them throughout the fluoropolymer matrix can be difficult. Interactions between the fluoropolymer and the additive can lead to reactions that may degrade either component. These interactions can also cause substantial decreases in the MFI (increasing melt viscosity) of the resulting compound, which further hinders its processability. In addition, this rise in viscosity can lead to overheating of the compound during processing that can lead to further degradation of the fluoropolymer.

It has now been found that the addition of a minor blend component along with the additive to the major blend component can substantially mitigate the interactions between the additive and the major blend component. The fluoropolymer blends of the invention may also serve to improve the dispersion of additives that are otherwise difficult to incorporate into the major blend component. In general, the fluoropolymers that are chosen as the minor blend component to improve the dispersion of the additive are from the same previously described classes of fluoropolymers and the same teachings for selection of the major and minor component apply.

One or more additive(s) may be incorporated into the fluoropolymer blend via any known means. For example, the additive may be pre-blended into the minor component and this mixture subsequently can be added to the major component. Alternatively, the additive(s) and minor component (s) together can be added to the major component(s) using one blending procedure. When the additive is pre-blended into the minor component, the amount of minor component in the final fluoropolymer blend may be as high as 20% by weight or higher.

In one embodiment the viscosity of the minor component may be significantly lower than that of the major component to aid the incorporation of the additive. This difference in viscosity between the two fluoropolymer components may an order of magnitude or greater, or even two orders of magnitude or greater.

In another embodiment, the minor component is chosen such that it has less of an interaction or interference with the additive than the major component. This embodiment of the invention helps incorporate an additive into the major blend component. An easy test to determine if a fluoropolymer is less interfering than another is to make a simple melt compound of the additive and the fluoropolymer and compare it to the compound of another fluoropolymer with the additive. The interactions that may occur include discoloration, off gassing, and changes in viscosity. Examples of reactive fluoropolymers are those which comprise partially fluorinated monomers.

While the minor component may aid in the process of dispersing the additive, the other benefits it provides to the fluoropolymer blend may be diminished by the presence of the additive in some embodiments. Means to minimize or even overcome this effect may be as simple as increasing the amount of the minor component fluoropolymer in the blend. An alternative is to provide an additional minor component to the blend. In this embodiment, one of the minor component fluoropolymers may serve primarily to improve the dispersion of the additive, while the other aids in the processing of the major component. The minor component that is intended for improving the processing of the overall blend can be added as the final ingredient after pre-blending the other components to minimize any adverse interactions with the rest of the mixture.

The blends of the invention can provide a variety of improvements to the extrusion process. In comparison to the extrusion of major component by itself, the inventive fluoropolymer blend can reduce the torque, and/or pressure in an extrusion process. It may also reduce surface defects such as melt fracture and improve the surface finish of extruded articles. Further, the addition of the minor component, even at very low levels, can minimize the formation of die drool that could otherwise occur from the major component. The inventive fluoropolymer blends may also allow for the processing of the major component at conditions that are otherwise not feasible for the major component, such as at colder temperatures and/or higher shear rates, and can allow for the economical processing of higher molecular weight major components to gain their benefits. The invention may also provide for improved control of the extrudate dimensions, such as caliper of wire coatings. Any of these listed benefits may occur either singly or in combination with others.

Depending on the selection and usage levels of the materials used to form the fluoropolymer blend, the benefits described above may occur almost instantaneously or more slowly over a period of time. If desired, the time for these benefits to present themselves may be lessened by using a higher concentration of the minor component at the outset of the extrusion process. This initial procedure may then be followed by the intended concentration of the FP blend for formation of the end-use article. Alternatively, the major component may be extruded alone for a period of time to receive the benefits of the fluoropolymer blend while the effect of the minor component still lingers in the extrusion equipment.

The inventive fluoropolymer blends provide benefits to known extrusion processes. In general, a single screw extruder or other device is employed to pump the blend through a die or tool to shape the extrudate into the desired form, such as a film, sheet, rod, tube, hose, wire coating, laminates, containers, and the like. End use articles produced from extrusion processes include, e.g., films, foils, hoses, wires, cables, coatings, laminates, bottles, and drums for applications such as chemical barriers, fluid transport, communications cables and chemical containment.

EXAMPLES

Materials

All monomers are reported as nominal values in weight percent. All polymers were commercially available or produced by known methods for aqueous emulsion polymerization.

| FP (fluoropolymer) | Description |
|---|---|
| A | Dyneon HTE X 1705, a semi-crystalline copolymer of 12% ethylene, 61% TFE, 27% HFP |
| B | Dyneon FEP 6322, a semi-crystalline copolymer of 86% TFE, 14% HFP |
| C | Dyneon PFA 6613N, a semi-crystalline copolymer of 96% TFE, 4% PPVE-1 |
| D | Dyneon THV 220G, a semi-crystalline copolymer of 40% TFE, 40% VF2 and 20% HFP |
| E | Semi-crystalline copolymer of 76% TFE, 13% VF2 and 11% HFP |
| F | Amorphous copolymer of 30% VF2, 14% TFE, 56% MV-31 and less than 1% of BTFE (bromotrifluoroethylene) |
| G | Amorphous copolymer of 78% TFE, 21% propylene, less than 1% BTFE |
| H | Dynamar FX-9613, an amorphous copolymer of 60% VF2 and 40% HFP |
| I | Semi-crystalline copolymer of 88% TFE, 12% propylene |
| J | Dyneon ET 6235, a semi-crystalline copolymer of ethylene, TFE and PPVE-1 |
| K | Dynamar PPA-2231, an amorphous copolymer of 60% VF2 and 40% HFP |
| L | Amorphous copolymer of 51% TFE, 48% MV-31, less than 1% BTFE |
| M | Dyneon HTE X 1500, semi-crystalline copolymer of 12% ethylene, 61% TFE, 27% HFP |
| N | Semi-crystalline copolymer of 38% TFE, 40% VF2, 18% HFP and 4% PPVE-1 |

Example 1

A fluoropolymer blend was prepared by tumbling a pellet mixture of 2 lbs (908 g) of FP-A with 18 lbs (8.18 kg) of FP-B. The blend was then feed to a 2 inch (5.08 cm) Davis Standard wire coating extruder with a mixing screw that was fitted with a GenCa 510 cross-head. The die and pin set used in the cross-head were 0.380 and 0.220 inches (9.65 mm and 5.59 mm) respectively. The temperatures of the extruder were set to deliver a melt temperature of 700° F. (371° C.) and the screw rpm's were set to give an output that would coat 7 mils (178 μm) of insulation onto 20 mil (508 μm) copper wire at 1500 fpm (457 mpm). Within minutes after the addition of the blend, the tubular extrudate was opaque and smooth and the pressure in the extruder had decreased about 35%. In addition, there were no visible signs of die drool or phase separation from the blend. This blend was immediately followed by the extrusion of pure FP-B. When the extrudate returned to transparent, indicating that the blend had largely exited the die, it remained free of melt fracture for a period of about 10 minutes. The melt fracture gradually reappeared over a period of about 5 more minutes and the pressure eventually returned to the previous starting value.

Comparative Example 1 (CE-1)

The extruder used in Example 1 was cleaned to bare metal and a sample of pure FP-B was feed at the same extrusion conditions. The extrudate exhibited severe melt fracture. At these conditions, nominal 20 mil (508 μm) copper wire was coated to an average diameter of 34 mils (864 μm). The resulting wire had a rough finish and subsequent analysis indicated the diameter down a 6 ft. (1.83 m) length of the wire varied by about +/−4 mils (+/−102 μm). The copper wire that was being coated had by itself a variation of less than +/−0.1 mils (+/−2.5 μm) indicating that most of the variation in the coated wire sample was occurring within the fluoropolymer coating.

Example 2

Following the procedure of Example 1, another blend was prepared containing 5% of FP-A and 95% FP-B. The two resins were feed to the extruder and a similar effect was observed as in example 1. After the blend had exited the die, the extruder was feed with only FP-B and copper was threaded through the die and the wire coating process begun. Both the inner and outer surfaces of the extrudate were visibly free of melt fracture. The resulting wire had a nominal diameter of 34 mils (8641 μm) with a variation of about +/−0.5 mils (12.7 μm).

Comparative Example 2 (CE-2)

Wire was prepared according to CE-1, but the extruder was adjusted to deliver a melt temperature of 760° F. (404° C.). The outside of the extrudate was smooth and the inside had a faint frosted appearance indicating mild melt fracture. The resulting wire had a diameter variation of about +/−1.5 mil (38 μm).

Example 3

A FP blend of 5% of FP-A and 95% FP-B was melt-compounded on a Berstorf twin screw extruder and extruded into pellets. The pellets had a white, opaque appearance and optical microscopy revealed the minor component to be well dispersed and distributed within the major component fluoropolymer. A portion of this blend was feed at a ratio of 1 part by weight of the blend with 4 parts of FP-B to the wire coating extruder used in Example 1. The extruder was operated under similar conditions to that of Example 1 and within 30 minutes the extrudate of FP-B, which contained 1% of the minor component FP-A, was visibly free of melt fracture. In contrast to comparative Example 2, the resulting wire of this experiment had a smoother finish and less diameter variation. The tensile and elongation properties of the wire were determined according to UL test method 444. Samples were tested both before and after heat aging (7 days @ 232° C.) and did not show any significant deviation from the sample produced in comparative example 2. This indicates that the presence of the minor component did not negatively affect the mechanical properties of the major component FP used to coat the wire.

Examples 4 through 11 and Comparative Examples 3 through 6

The following sets of experiments were conducted to show the changes in extrusion performance and/or changes in surface appearance of various fluoropolymer blends. The individual fluoropolymers utilized were in either pellet or powder form or in the form of small cubes about the size of the pellets. Fluoropolymer blends were produced by tumbling 5 wt % of a minor component along with 95 wt % of a major component and feeding the mixture to a Brabender single screw extruder equipped with a rod die. The die had a 0.1125 inch (2.9 mm) diameter orifice and was fitted with a die tip heater. Before extruding any of the blends, the major component of a given blend was first extruded by itself. The output rate and temperature settings of the extruder and die were adjusted until the major component exhibited severe sharkskin-type melt fracture. The FP blend was then extruded under the same conditions and observed for changes in extrusion pressure and torque, or for changes in the appearance of the extrudate, in comparison to the major component. In between each experiment, the major component was extruded by itself to re-establish the starting conditions. In some instances, the extruder was disassembled and cleaned.

Examples 4 through 6; See Results in Table 1

TABLE 1

| Experiment | Major | Minor | Melt temp. | % Pressure Decrease | Appearance |
| --- | --- | --- | --- | --- | --- |
| Ex. 4 | FP-B | FP-A | 371 | 65 | smooth, milky |
| Ex. 5 | FP-B | FP-E | 371 | 8 | smooth, clear |
| Ex. 6 | FP-B | FP-F | 371 | 25 | clear, smooth |

Example 7

A blend of 5% FP-G and 95% FP-B was extruded under the same conditions of example 4 to demonstrate the method claim of the invention. The blend had a 15% drop in extrusion pressure compared to FP-B. The extrudate appeared free of melt fracture, but had a rough surface believed to be caused by the poor quality of dispersion in the fluoropolymer blend.

Comparative Example 3 (CE-3)

A blend of 5% of an amorphous copolymer of VF2 and HFP(FP-H) and 95% FP-B was extruded under the same conditions as Example 4. The extrudate was brown and full of bubbles.

Example 8

A fluoropolymer blend of 5% of FP-J and 95% of FP-C was extruded under the same conditions as Example 4, except an extrusion temperature of 360° C. was used. The extrudate had a smooth surface and was less translucent than FP-C.

Example 9

The procedure of Example 8 was repeated except that FP-J was substituted for the minor component. About a 20% decrease in extrusion pressure occurred and the extrudate was smooth and opaque.

Comparative Example 4

The procedure of Example 8 was repeated except that FP-K was substituted for the minor component. The extrudate was tan and contained bubbles.

Example 10

The procedure of Example 8 was repeated except that FP-L was substituted for the minor component and FP-D was substituted for the major component. The extrusion temperature was set at 210° C. and the die tip heater was not used. The torque during extrusion was about 5% less than FP-D alone. The extrudate was melt fractured and milky in appearance.

Example 11

The procedure of Example 10 was repeated except that FP-M was substituted for the minor component. The torque during extrusion was about 10% less than FP-D alone. The extrudate was melt fractured and clear in appearance.

Comparative Example 5

The procedure of Example 10 was repeated except that FP-N was substituted for the minor component. There were no changes in torque or pressure during extrusion. The extrudate was transparent and the melt fracture appeared worse than that of FP-D when it was extruded alone.

Comparative Example 6

The procedure of comparative Example 10 was repeated except that FP-H was substituted for the minor component. There were no changes in torque or pressure during extrusion. The extrudate was opaque and exhibited melt fracture.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually incorporated by reference.

What is claimed is:

1. A method of improving extrusion properties in an extrudate comprising
    (i) blending a major amount of a first fluoropolymer, wherein the first fluoropolymer comprises a semi-crystalline fluorinated copolymer, and a minor amount of a second fluoropolymer effective to improve extrusion properties in the blend, and
    (ii) melt processing the blend to form the extrudate, wherein the first fluoropolymer is selected from class:
        (a) a semi-crystalline perfluorinated copolymer;
        (b) a fluoropolymer derived from interpolymerized units of at least one essentially perfluorinated monomer, at least one non-fluorinated hydrogen-containing monomer, and, optionally, perfluorobutyl-ethylene and/or no more than about 1% by weight of other partially fluorinated monomers; and
        (c) a fluoropolymer derived from interpolymerized units of at least one 5% by weight of at least one partially-fluorinated monomer selected from vinylidene fluoride, vinyl fluoride, and/or tri-fluoroethylene, and optionally at least one essentially perfluorinated monomer;
    and wherein the second fluoropolymer is selected from class (a); (b); (c);
        (d) an amorphous copolymer of tetrafluoroethylene and hexafluoropropylene; and
        (e) an amorphous fluorinated copolymer derived from interpolymerized units of a perfluoro (alkoxy vinyl) ether and a comonomer which may be partially or fully fluorinated;
    wherein when the first fluoropolymer is selected from (a), the second fluoropolymer is a fluoropolymer selected from at least one material of class (b), a semi-crystalline material of class (c), and/or a material from class (e);

when the first fluoropolymer is selected from (b), the second fluoropolymer is selected from (a), (c), (d), and/or (e); and when the first fluoropolymer is a copolymer selected from (c), the second fluoropolymer is selected from (a), (b), (d), and/or (e), with the proviso that, when the blend comprises one or more copolymers selected from (c), the blend comprises either at least about 80% by weight of copolymers selected from (c) or no more than about 5% by weight of copolymers selected from (c).

2. The method of claim 1 wherein the first fluoropolymer comprises a semi-crystalline perfluorinated copolymer.

3. The method of claim 2 wherein the second fluoropolymer comprises a fluoropolymer derived from interpolymerized units of at least one essentially perfluorinated monomer and at least one non-fluorinated hydrogen-containing monomer; and/or a semicrystalline fluoropolymer derived from interpolymerized units of at least one partially-fluorinated monomer, and optionally at least one essentially perfluorinated monomer.

4. The method of claim 2 wherein the second fluoropolymer comprises an amorphous fluorinated copolymer derived from interpolymerized units of a perfluoro (alkoxy vinyl) ether and a comonomer which may be partially or fully fluorinated.

5. The method of claim 4 wherein the second fluoropolymer comprises an amorphous fluorinated copolymer derived from interpolymerized units of at least 3 mole percent (mol %) of an hydrogen containing comonomer, and a perfluoro (alkoxy vinyl) ether.

6. The method of claim 1 wherein the first fluoropolymer comprises a fluoropolymer derived from interpolymerized units of at least one essentially perfluorinated monomer and at least one non-fluorinated hydrogen-containing monomer.

7. The method of claim 6 wherein the second fluoropolymer comprises a semi-crystalline perfluorinated copolymer; and/or a fluoropolymer derived from interpolymerized units of at least one partially-fluorinated monomer, and at least one essentially perfluorinated monomer.

8. The method of claim 6 wherein the second fluoropolymer comprises an amorphous fluorinated copolymer derived from interpolymerized units of a perfluoro (alkoxy vinyl) ether and a comonomer which may be partially or fully fluorinated.

9. The method of claim 8 wherein the second fluoropolymer comprises an amorphous fluorinated copolymer derived from interpolymerized units of at least 3 mole percent (mol %) of an hydrogen containing comonomer, and a perfluoro (alkoxy vinyl) ether.

10. The method of claim 1 wherein the first fluoropolymer comprises a fluoropolymer derived from interpolymerized units of at least one partially-fluorinated monomer, and at least one essentially perfluorinated monomer.

11. The method of claim 10 wherein the second fluoropolymer comprises a semi-crystalline perfluorinated copolymer; and/or a fluoropolymer derived from interpolymerized units of at least one essentially perfluorinated monomer and at least one non-fluorinated hydrogen-containing monomer.

12. The method of claim 10 wherein the second fluoropolymer comprises an amorphous fluorinated copolymer derived from interpolymerized units of a perfluoro (alkoxy vinyl) ether and a comonomer which may be partially or fully fluorinated.

13. The method of claim 12 wherein the second fluoropolymer comprises an amorphous fluorinated copolymer derived from interpolymerized units of at least 3 mole percent (mol %) of an hydrogen containing comonomer, and a perfluoro (alkoxy vinyl) ether.

14. The method of claim 1 wherein the second fluoropolymer comprises an amorphous copolymer of tetrafluoroethylene and hexafluoropropylene.

15. The method of claim 1 wherein the improved extrusion property is selected from reduced melt defects, reduced extruder torque, reduced extrusion pressure, improved surface properties, and combinations thereof.

16. The method of claim 1 wherein the minor amount of second fluoropolymer comprises less than about 1 part by weight of the blend.

* * * * *

UNITED STATES PATENT AND TRADEMARK OFFICE
CERTIFICATE OF CORRECTION

PATENT NO. : 7,008,587 B2
APPLICATION NO. : 10/915614
DATED : March 7, 2006
INVENTOR(S) : Thomas J. Blong It is certified that error appears in the above-identified patent and that said Letters Patent is hereby corrected as shown below:

Title Page
Col. 2, line 6 (FOREIGN PATENT DOCUMENTS), delete "5803740 A" and insert --58038740 A--, therefor.

Col. 2, line 9 (FOREIGN PATENT DOCUMENTS), after "8/1996" insert --C08F214/26--

Col. 2, line 10 (FOREIGN PATENT DOCUMENTS), after "6/2001" insert --C08L 23/04--

Col. 3,
Line 58, delete "$R_f'$is:" and insert --$R_f'$ is--, therefor.

Line 59, delete "$O(R_{2f}O)$" and insert --$O(R^2_f O)$--, therefor.

Col. 12
Line 15, delete "(8641 μm)" and insert --(864 μm)--, therefore.

Col. 14
Line 50, in claim 1, before "5%" delete "one".

Signed and Sealed this

Third Day of October, 2006

JON W. DUDAS
*Director of the United States Patent and Trademark Office*